Jan. 28, 1947. R. F. FOARD Re. 22,835

MEANS FOR SCREEN PRINTING ON CLOTH

Original Filed May 18, 1942 4 Sheets-Sheet 1

INVENTOR
ROBERT F. FOARD
BY Floyd Spencer
ATTORNEY

Jan. 28, 1947. R. F. FOARD Re. 22,835

MEANS FOR SCREEN PRINTING ON CLOTH

Original Filed May 18, 1942 4 Sheets-Sheet 2

INVENTOR
ROBERT F. FOARD
BY Floyd Spencer
ATTORNEY

Jan. 28, 1947. R. F. FOARD Re. 22,835

MEANS FOR SCREEN PRINTING ON CLOTH

Original Filed May 18, 1942 4 Sheets-Sheet 3

INVENTOR.
ROBERT F. FOARD
BY Ployd Spencer

Jan. 28, 1947. R. F. FOARD Re. 22,835

MEANS FOR SCREEN PRINTING ON CLOTH

Original Filed May 18, 1942 4 Sheets-Sheet 4

INVENTOR.
ROBERT F. FOARD
BY Lloyd Spencer

Reissued Jan. 28, 1947

Re. 22,835

UNITED STATES PATENT OFFICE 22,835

MEANS FOR SCREEN PRINTING ON CLOTH

Robert F. Foard, Los Angeles, Calif.

Original No. 2,369,290, dated February 13, 1945, Serial No. 443,411, May 18, 1942. Application for reissue February 11, 1946, Serial No. 646,728

8 Claims. (Cl. 101—115)

My invention relates to means for screen printing on cloth, and among the objects of my invention are:

First, to provide a screen printing means which is particularly adapted for use in conjunction with my screen printing apparatus embodied in Patent Number 2,206,176 issued July 2, 1940;

Second, to provide a screen printing means which adapts the screen printing apparatus of the above named patent to the screen printing of yardage; that is, an entire bolt or web of cloth may be screen printed.

Third, to provide a screen printing means which incorporates a novel arrangement for insuring proper registry between succeeding design units; that is, a continuous design may be printed in sections or units and the confronting edges of the sections matched or registered so that there is no noticeable break or discontinuity in the design.

Fourth, to provide a screen printing means whereby designs formerly capable of being printed only by expensive rotary printing machines may be printed by a comparatively inexpensive screen printing equipment; thereby making feasible the printing of a comparatively few yards of a particular design, whereas the conventional rotary printing machines must print literally thousands of yards to justify economically the expense of rotary printing plates, and preparing or setting up the rotary printing machinery.

Fifth, to provide a screen printing means which not only accomplishes satisfactory registry between design units for the purposes of printing a continuous design but also provides inherently very close registry between a series of printing screens applied to the same area for the purpose of multiple color printing.

With the above and other objects in view, reference is made to the accompanying drawings, in which.

Figure 1:
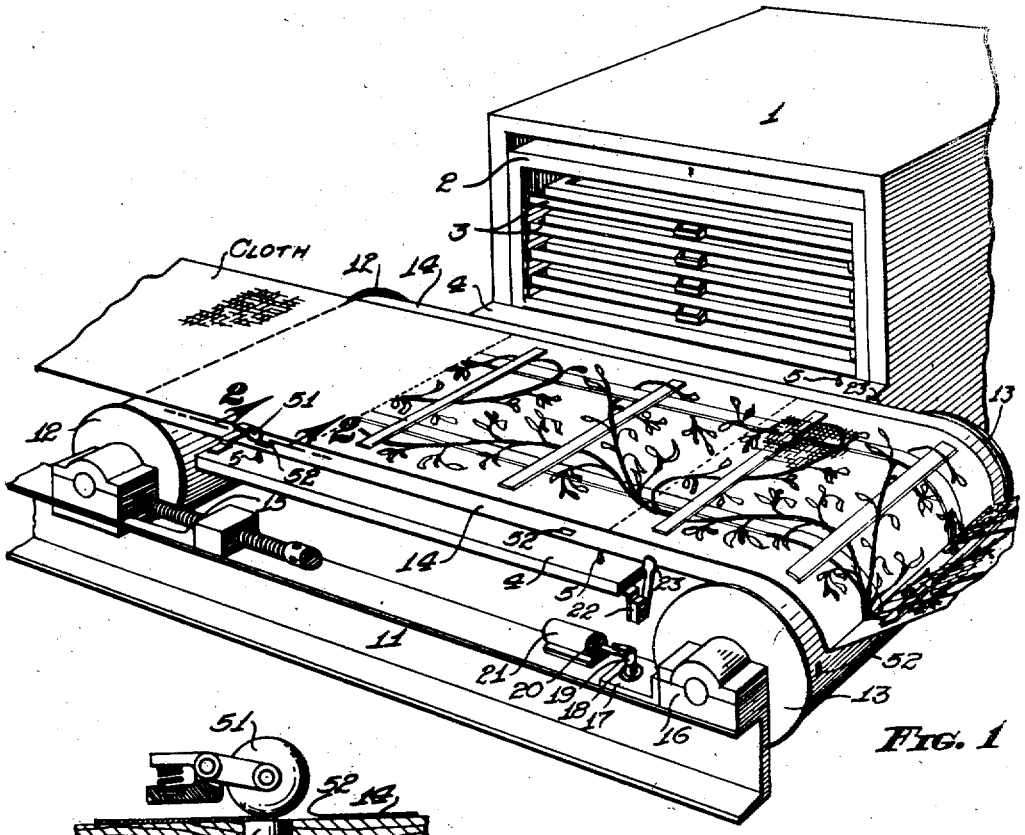
Figure 1 is a fragmentary perspective view of my screen printing means shown in conjunction with the screen printing apparatus of my former patent mentioned hereinbefore.
Figure 2:
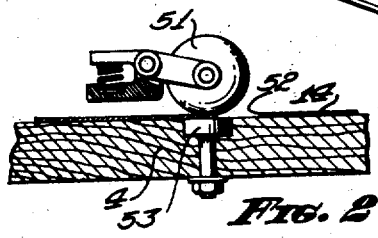
Figure 2 is a fragmentary sectional view through 2—2 of Fig. 1 showing particularly the registry switch.

The screen printing apparatus for the embodiment of my invention disclosed in Fig. 1 is particularly adapted, and which is disclosed more fully in the aforementioned patent, comprises a housing 1, in which is mounted an elevator cage 2. The elevator cage carries a plurality of printing frames 3 which are adapted to be withdrawn from the cage and be placed over the cloth to be printed which rests on a table 4. Each printing frame includes a screen formed of silk or fine-meshed cloth on which has been formed suitable design portions of which are impermeable and other portions of which are permeable to ink or dyestuff. The dyestuff is worked through the permeable portions of the screen by a "squeegee" and onto the cloth below.

Each printing frame prints a single color and several frames are used for multiple color printing. Each of the frames is provided with suitable means which register with registering pins 5 provided in the table 4. Each frame includes means whereby it may be adjusted in order that the frames register with each other when alined on the pins 5.

In my previous patent, clamp frames were provided in the table 4 to hold the material to be printed, which material was cut to size and was therefore suitable only for comparatively small units of cloth as distinguished from yardage. In the present application, the adhesive characteristics of the dyestuff is employed to hold the cloth on a backing sheet and is advanced across the table by the backing sheet in stages so that an entire bolt of cloth may be printed with a continuous design and later cut as desired.

Below the table 4 is a frame 11 on which are mounted two drums, an idler drum 12 at the leading side of the table and a driving drum 13 at the trailing side of the table. An endless backing sheet 14 passes around the drums, the operating or upper side extending across the top of the table 4 and the return or lower side passing below the table.

The loop formed by the backing sheet has a length which is a multiple of the width of the design printed by the screen printing apparatus. The idler drum 12 is adapted to be moved to or from the driving drum 13 by means of spacing screws 15 in order that the length of the backing may be accurately adjusted or to accommodate backing sheets of different lengths depending upon the width of the design to be printed. The functions of the backing sheet will be described in more detail hereinafter.

It is desirable that the backing sheet travel around the drums without lateral or edgewise shifting. This is accomplished by maintaining the surfaces of the drums in parallel planes. Practically it is difficult to maintain exact parallelism; therefore, in order to control edgewise shifting of the backing sheet, one end of the drive drum 13 is provided with means for shifting its axis slightly. Movement of only a few thousandths of an inch is sufficient. One of the end bearings 16 of the driving roller includes an eccentric plate 17 fitted with an eccentric 18 from which extends an arm 19. The arm 19 is actuated by the armature 20 of a solenoid 21. The solenoid may have two coils so that when one is energized the bearing 16 is moved one direction a few thousandths of an inch, and when the other is energized the bearing is moved a like amount in the opposite direction. The solenoid 21 is controlled by two switches 22 mounted below the upper side of the backing sheet 14 from which extends arms 23 which engage the edges of the backing sheet at the edge of the work table 4 adjacent the driving roller. The switches 22 may be the type known commercially as "Micro-switches." Such switches are capable of adjustment so that movement of as little as a thousandth of an inch causes them to open or close and little pressure is required, well within the permissible pressure against the edge of the backing sheet.

The driving drum 13 is provided at one end with a pulley 31 and connected by belt 32 and drive pulley 33 with an electric motor 34. Interposed between the drive pulley 33 and motor is a speed control mechanism shown in Figs. 5 and 6. The drive pulley 33 journals on the shaft 35 of the motor 34. Secured to opposite sides of or formed integrally with the drive pulley are ratchet wheels 36 and 37. Adjacent ratchet wheel 36 and secured to the shaft 35 is a forward drive gear 38. Similarly, adjacent the ratchet wheel 37 but journaled on the shaft 35 is a reverse drive gear 39. The drive gears 38 and 39 carry pawls 40 which engage their respective ratchet wheels. The forward drive gear is connected through a speed reduction unit 41 with the reverse drive gear.

The ratchet wheels and their respective pawls are so arranged that when the motor shaft 35 is rotating in one direction, the forward drive gear 38 is connected through its pawl 40 to the corresponding ratchet wheel 36 so that the drive pulley 33 rotates at the same speed and in the same direction as the shaft 35, and ratchet wheel 37 and its pawl slip. When however, the shaft 35 is rotated in the oposite direction the pulley wheel does not change its direction of rotation, but instead moves at a slower speed. Thus, by reversing the direction of rotation of the motor, the speed of forward travel of the backing sheet may be changed from fast to slow.

The motor is controlled by a relay system, to be described hereinafter, which is initiated by contact roller 51 mounted so as to ride along a margin of the backing sheet 14. The backing sheet has provided therein along the path of the roller a series of accurately placed slots 52. These permit engagement by the roller of a contact plate 53 mounted on the work table below the roller. The relay system is so arranged that when the contact roller makes contact with the plate 53, the forward speed of the backing sheet drops from fast to slow, and when the backing sheet again breaks contact as the slot passes beyond the roller the backing sheet stops. The relay system is shown diagrammatically in Fig. 7. The motor 34 is started by a motor starting relay 54 which is provided with motor supply contacts 55 and holding contacts 56. The supply contacts 55 are in series with the source of electrical energy so that when closed complete the circuit to the motor. The holding contacts 56 are in series with the armature 57 of the relay. A starting switch 58, adapted to be momentarily closed by the operator, is placed in parallel with the holding contacts 56 and in series with the armature 57 so that when the starting switch 58 is closed momentarily, the motor starting relay 54 is actuated to start the motor and remains energized after the starting switch 58 is released.

Any type of reversible motor may be employed. Reversal is effected with most types by reversing the electrical connections of the motor field coils. Accordingly a reversing relay 59 is provided which includes double pole, double throw reversing contacts 47. The armature 60 of the reversing relay 59 is energized by engagement of the contact roller 51 with contact plate 53 and remains energized only so long as the contact is maintained.

In order that the motor will not return to high speed but will stop when contact is broken by the backing sheet after such contact, a resetting relay 61 is provided. The armature 62 of this relay is energized by closure of control contacts 63 incorporated in the reversing relay 59. These contacts are closed when the reversing relay is actuated. The reversing relay is provided with supplemental holding contact 64 connected in series with the holding contacts 56 of the starting relay 54. Similarly the resetting relay 61 is provided with supplemental holding contacts 65 also in series with the holding contacts 56, but in parallel with the contacts 64; thus if either of the supplemental holding contacts 64 or 65 are closed along with the holding contacts 56, the circuit through the armature of the starter relay is held closed. The resetting relay 61 arranged so that its supplemental holding contacts 65 are normally closed, whereas the supplemental holding contacts 64 are normally open. Thus, when the reversing relay is operated, contacts 64 close, while contacts 65 open. A time delay means 66 is incorporated in the resetting relay 61 so that contacts 65 lag in closing and for a moment following release of the reversing switch both contacts 64 and 65 are open, thereby de-energizing the starter switch and shutting off the motor.

Operation of my screen printing apparatus is as follows:

The backing sheet 14 may be formed of paper. It is extended around the rollers 12 and 13 and its ends cemented together. The length of the backing sheet is carefully determined so that its circumference is an exact multiple of the length of design to be printed on the cloth; that is, the design may be three feet long and the backing sheet be twelve feet in length. Slots 52 are punched along one margin of the backing sheet. These slots, particularly the trailing edge or the edge which breaks the contact between the roller 51 and plate 52, are accurately located for these edges determine at what points the movement of the backing sheet stops. The backing sheet should stop each time so that it is in predetermined relationship to the work table and printing frames and moves each time a distance equal to the length of the design unit. Inasmuch as the backing sheet is formed of paper, an ordinary paper punch may be used to form the slots 52. Should they be improperly placed, small bits of adhesive paper may be applied over the trailing edges of the slots to effect the desired adjustment.

After checking the operation of the backing sheet and the switch arms 23 to determine if any tendency to shift laterally is adequately controlled, a print is made on the backing sheet by use of one of the printing frames 3. This may be made at only one position or repeated around the length of the backing sheet.

Cloth C from a bolt or roll C1 is fed through guide rollers 91 onto the backing sheet. The guide rollers are preferably arranged so that the cloth in passing therefrom is substantially flush with the surface of the backing sheet. The extremity of the cloth is placed over the backing sheet and onto the print. The dyestuff employed to make the print contains sufficient adhesive material to stick the cloth to the backing sheet.

The print made by the first printing frame is repeated on top of the cloth and the remaining printing frames used to make a complete multiple color print on the cloth. When all colors of the design are printed, switch 58 is closed. The backing sheet moves forward at its fast speed until the succeeding slot 52 permits contacts 51 and 53 to close; thereupon, the backing sheet creeps forward at slow speed until contact again breaks causing the motor to stop. The adhesiveness between the backing sheet and cloth is sufficient to pull the cloth forward to the following position without other means of connection therebetween. The printing operation is then repeated; the backing sheet again moved and so on until the entire bolt of cloth is printed.

Normally sufficient dyestuff seeps through the cloth to maintain sufficient bond for moving the cloth along with the backing sheet. In printing heavy cloth, it is sometimes desirable to supplement the dyestuff with an adhesive by applying the adhesive directly to the backing sheet, preferably opposite the margins of the cloth if the width of the design is less than the width of the cloth leaving such margins unprinted.

By the exercise of a little care very close registry may be obtained between the adjacent edges of succeeding prints so that a continuous design may be printed on the cloth, comparable in appearance and accuracy of registration to that obtained by far more expensive rotary printing machines.

While paper has been used as the backing sheet, other material may be used. By reason of the fact that the cloth remains attached to and is held by the backing sheet during the entire multiple color printing operation very close registry is obtained. The cloth is prevented by the adhesiveness of the dyestuff from shifting on the backing sheet and the backing sheet is sufficiently stiff and stretch free to maintain its position.

It is necessary that each time a particular section of the design on the backing sheet returns to position it registers perfectly with the printing frames. Although the backing sheet is used repeatedly there is no cumulative error and no error is introduced by a slippage between the drums and the backing sheet because registration for each section of the backing sheet is determined by a corresponding slot 52. Furthermore, even though there may be an appreciable change in the length of the backing sheet due to shrinkage or expansion, the only error that is thus introduced is the amount of shrinkage or expansion that has taken place between each slot and its corresponding section of the backing sheet, an obviously insignificant amount.

In practice, it has been found that a backing sheet of ordinary wrapping paper will permit printing of a standard bolt of cloth before the cumulative seepage of dyestuff through the cloth becomes objectionable. This, of course, may be controlled by regulating the viscosity of the dyestuff; however, it is the matter of only a few minutes to replace the backing sheet so that, in practice, the backing sheet is replaced as each bolt is completed. If other materials such as sheet plastic is used, the backing sheet need not be replaced but merely cleaned from time to time. A still more permanent backing sheet may be made of sheet metal, in which event the operation of the roller switch 51 is reversed; that is, it is arranged to normally make contact and the circuit is open when the slot is engaged or a small piece of insulating material is applied in place of the slot.

Figure 3:
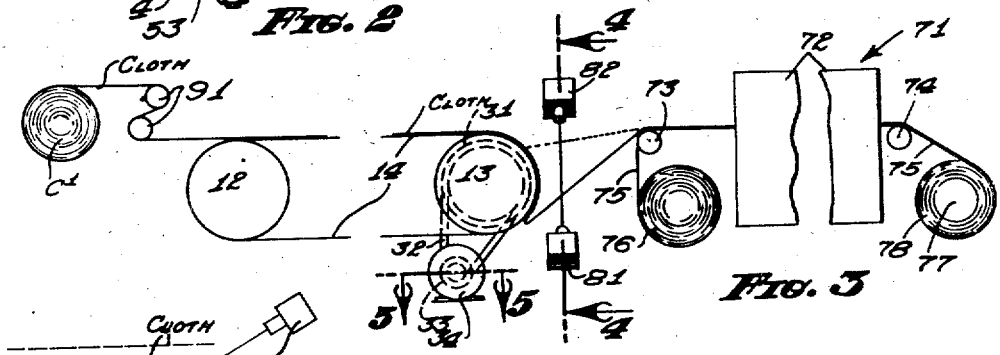
Figure 3 is a diagrammatical view showing the manner in which the cloth is moved through the printing means and into the dryer or steamer.

The bond between the cloth and the backing sheet need not be great, but is weak enough to permit the cloth to be peeled therefrom. For example, as shown in Fig. 3, the cloth passes from the printing apparatus into either a dryer or steamer 71 depending upon the subsequent treatment required for the dyestuff. In either case, a housing 72 is provided. Guide rollers 73 and 74 are arranged at each end. A markoff sheet 75 initially formed in a roll 76 feeds over roller 73 through the housing 72 over roller 74 to a drum 77 driven by a motor, not shown, and forms with the cloth C a second roll 78. The cloth, after printing, passes onto the mark-off sheet and with mark-off through the housing 71 and is rolled therewith around the drive shaft 77.

Figure 4:
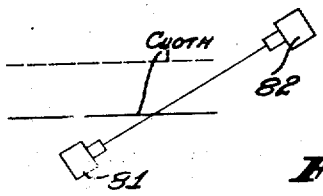
Figure 4 is a sectional view through 4—4 of Fig. 3 showing the relationship of the cloth and the photo-electric control means.

To coordinate control of the printing apparatus and the dryer or steamer, a photo-electric unit may be employed. This consists of a source of light 81 directed to a photo-electric cell 82 and positioned between the printing apparatus and the roller 75. The photo-electric unit is so arranged, as shown in Fig. 4, that when the cloth follows around the backing sheet as indicated by solid lines in Figs. 3 and 4 a relay is actuated to cause movement of the marking-off sheet and cloth through the dryer or steamer. When the cloth reaches a position almost tangent to the drive drum 13, as indicated by dotted lines in Figs. 3 and 4, the movement of the cloth through the steamer or dryer is stopped.

My novel method, herein involved, of printing on cloth consists essentially in utilizing an endless backing sheet to pass in front of the screen printing apparatus; utilizing the adhesiveness of the dyestuff used in screen printing to hold the cloth to the backing sheet thereby to facilitate registry to permit multiple color printing; and utilizing the adhesiveness of the dyestuff to draw the cloth from the source of supply onto the backing sheet.

Figure 9:
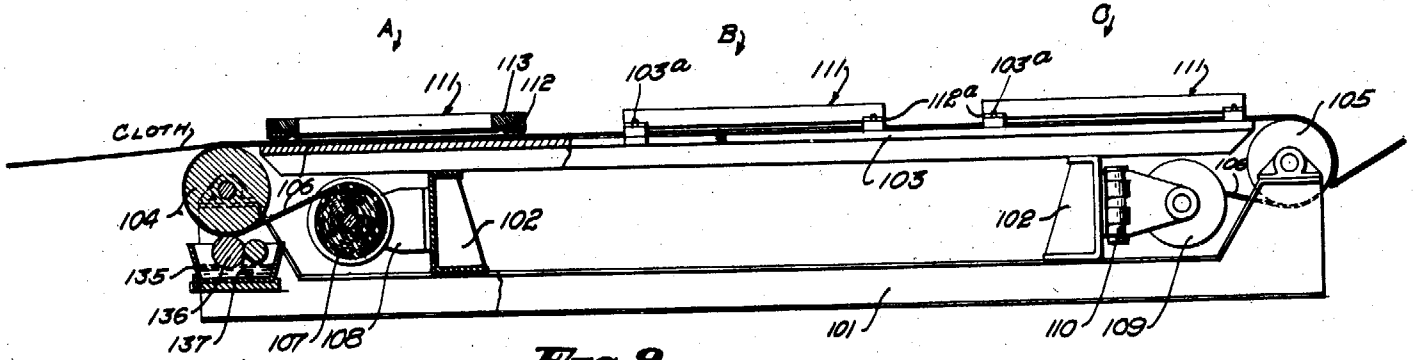
Figure 9 is a partial elevational, partial sectional view through 9—9 of Fig. 8.
Figure 10:
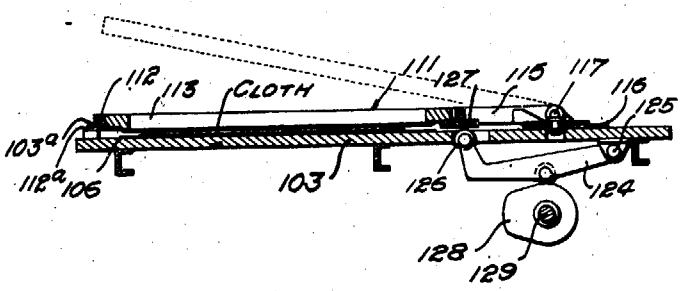
Figure 10 is a transverse sectional view through 10—10 of Fig. 8.
Figure 11:
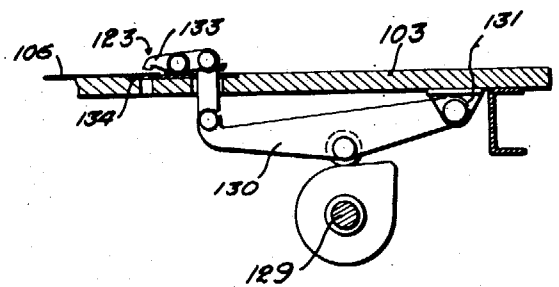
Figure 11 is an enlarged fragmentary transverse sectional view through 11—11 of Fig. 8.

Attention is now directed to the construction shown in Figs. 9 through 11, which incorporates an arrangement of the screen printing frames in which the frames are arranged in lateral series and may be applied simultaneously to the cloth.

A bed frame 101 supports a pair of cross members 102 which in turn support a table 103. At the extremities of the table are rollers 104 and 105 around which pass a backing sheet 106. In place of the endless backing sheet 14 of the first described structure, the backing sheet is in the form of a web coextensive with the cloth to be printed. The sheet is supplied from a roll 107 mounted under the entering or beginning end of the table on suitable bracket bearings 108, and winds up after passing over the table on a roll 109 mounted on bracket bearings 110 under the training or finishing end of the table. The bearing brackets are arranged so that the rolls may be readily inserted or removed.

Over the table are mounted screen printing units 111, each unit comprises a hollow, rectangular outer frame 112 of angle iron section and an inner frame 113, the position of which is adjustable by quoins 114. Or, if desired the printing frame construction described in my previous patent may be used. Arms 115 extend rearwardly from each outer frame 112. Rearwardly of each frame is a plate 116 secured to the table 103. Each plate carries a pair of hinge pins 117 slidable in guide members 118 and adapted to be moved by a link and lever means 119. The journal pins 117 are adapted to move outwardly from each other to pivotally engage the extremities of the arms 115 and move inwardly to free the arms so that the printing units may be readily interchanged.

The journal pins hold the printing units in predetermined registry with the work table and are assisted by registry pins 103*a* set in the table which coact with sockets provided in brackets 112*a* extending from the outer frame 112 of each printing unit.

Three printing units, designated generally A, B, and C, are illustrated, although two, four or five may be provided. The printing units are positioned so that the width of the effective printing area 120 of each printing unit is just equal to the distance between the effective printing areas of adjacent printing units.

Figure 5:
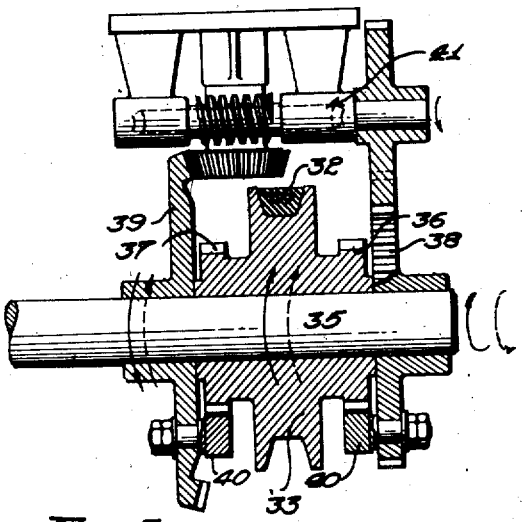
Figure 5 is a fragmentary sectional view through 5—5 of Fig. 3 illustrating the speed control mechanism interposed between the drive motor and the belt which actuates the cloth feeding mechanism.
Figure 6:
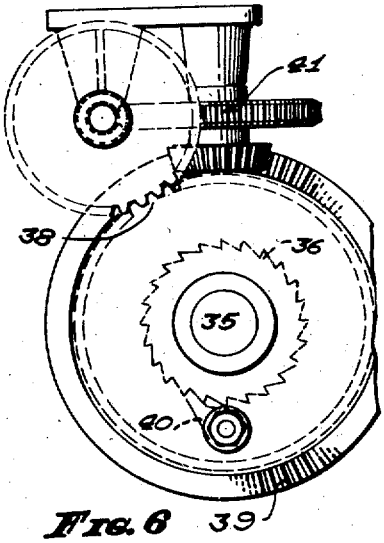
Figure 6 is an end elevational view of the differential drive mechanism.
Figure 7:
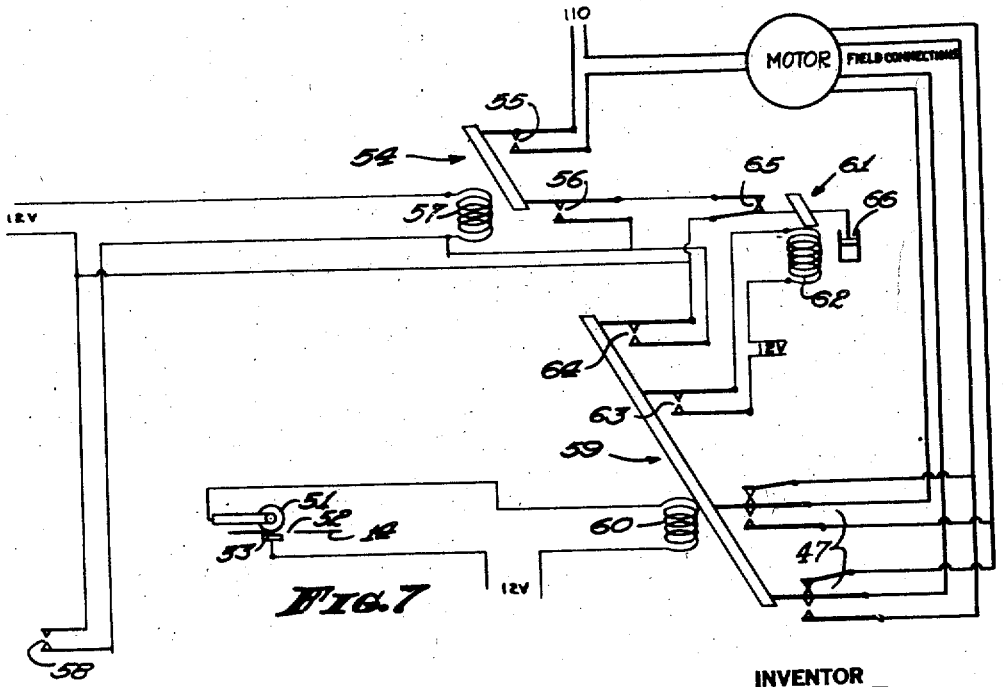
Figure 7 is a wiring diagram of the electrical control circuit for the cloth feeding mechanism.

As in the first described structure the backing sheet is provided with registration slots 52 and the movement of the backing sheet is controlled by the apparatus shown in Figs. 5, 6, and 7 connected with the shaft of the roll 109. A roller switch 121 similar to the roller switch 51 is provided. The roller switch 121 is, however, provided with set screws 122 so that it may be accurately adjusted longitudinally with respect to the backing sheet. It is shown positioned over the rear margin of the backing sheet between printing units B and C, but may be positioned elsewhere.

The registration slots 52 may be formed automatically in the backing sheet by a punch 123 positioned the proper distance from the roller switch 121. The punch is shown positioned between the first pair of printing units A and B.

The printing frames are adapted to be tilted about the axes of the hinge pins. They may be raised manually or may be operated automatically or semi-automatically by a lifting mechanism positioned below the table along its rear portion. The lifting mechanism includes a lever 124 for each printing unit which is fulcrumed at its rear end by a bracket bearing 125 secured to the underside of the table near its rear edge and in substantial alinement with the longitudinal axis of the corresponding printing unit. Each lever is bent upwardly at its forward or extended end and provided with a roller 126. The roller 126 is adapted to pass through an opening in the table and engage a plate 127 secured to the rear side of the outer frame 112 of the corresponding printing unit.

The levers 124 are adapted to be raised by cams 128 mounted on a cam shaft 129 extending along the underside of the table 103. The shaft may be driven continuously by suitable means not shown and the cams arranged so that the printing frames remain down long enough to permit the printing operation then raise to permit movement of the backing sheet and cloth thereon. Or, if desired, may go through a single cycle of operation initiated each line by the operator. The frames are at all times free to be lifted manually by the operator.

The shaft 129 may also be utilized to operate the punch 123 as shown in Fig. 11. A lever 130 fulcrumed at its rear end by a bracket bearing 131 extends forwardly over the cam shaft and is connected at its forward end by a link 132 to the punch 123, which is shown as comprising a punch lever 133 fulcrumed at its midportion and coacting with a punch plate 134 under the backing sheet.

The backing sheet is adapted to be coated with an adhesive or semi-adhesive material 135 as it passes around the leading roller 104. The material is applied by a roller 136 which dips into a reservoir 137 containing the adhesive material. The adhesive material should be just "tacky" enough to hold the cloth for the purpose of printing, but permit the cloth to peel therefrom as in the first described structure so that the cloth can move into the steamer or dryer unit 71 as shown in Fig. 3.

The various gums or adhesives which I have found suitable as an element in the printing dye such as tragacanth; gum arabic, "British gum" or dextrine, may be employed in the adhesive material 135. In addition certain elements of the printing dye age or evaporate and therefore require additions from time to time. These may be incorporated with the adhesive material 135 and adsorbed by the cloth so as to be picked up by the dyestuff as it is applied to the cloth and thereby improve the printing operation. For example: in one family of dyestuff a material known commercially as "Rongalite" may be added to the adhesive to replace or replenish the Rongalite in the printing dye which may have deteriorated or evaporated.

Operation of the construction shown in Figs. 8, 9, 10, and 11 is as follows:

The printing units are adjusted with respect to each by means of the quoins 114 so that the distance between their printing areas is just equal to the width of their printing areas. The punch 123 is used to make an initial perforation 52. The backing sheet is moved the exact width of the printing area and a second perforation made. The backing sheet is again moved the width of the printing area and a third punch is made. The position of the roller switch 121 is then adjusted so that it coacts with the first perforation 52 to stop the backing sheet in the desired position.

The cloth is then fed onto the backing sheet under the first printing unit, designated A. A print is made and a new perforation is formed in the backing sheet. Then the backing sheet is advanced the width of the printing area as controlled by the roller switch 121 and a second print made with unit A. This is repeated and unit B is used on the first print. Units A and B are then used until the first print or impression is in registry with unit C, then the process is continued, all of the units A, B, and C are applied between each advance of the cloth and backing sheet.

The driving mechanism shown in Figs. 5 and 6 is connected with the shaft of roll 109 and although the diameter of the roll changes, the spacing is unchanged as it is governed by the space between perforations 52. The cloth when printed is removed from the backing sheet and into the next machine as shown in Fig. 3.

Figure 8:
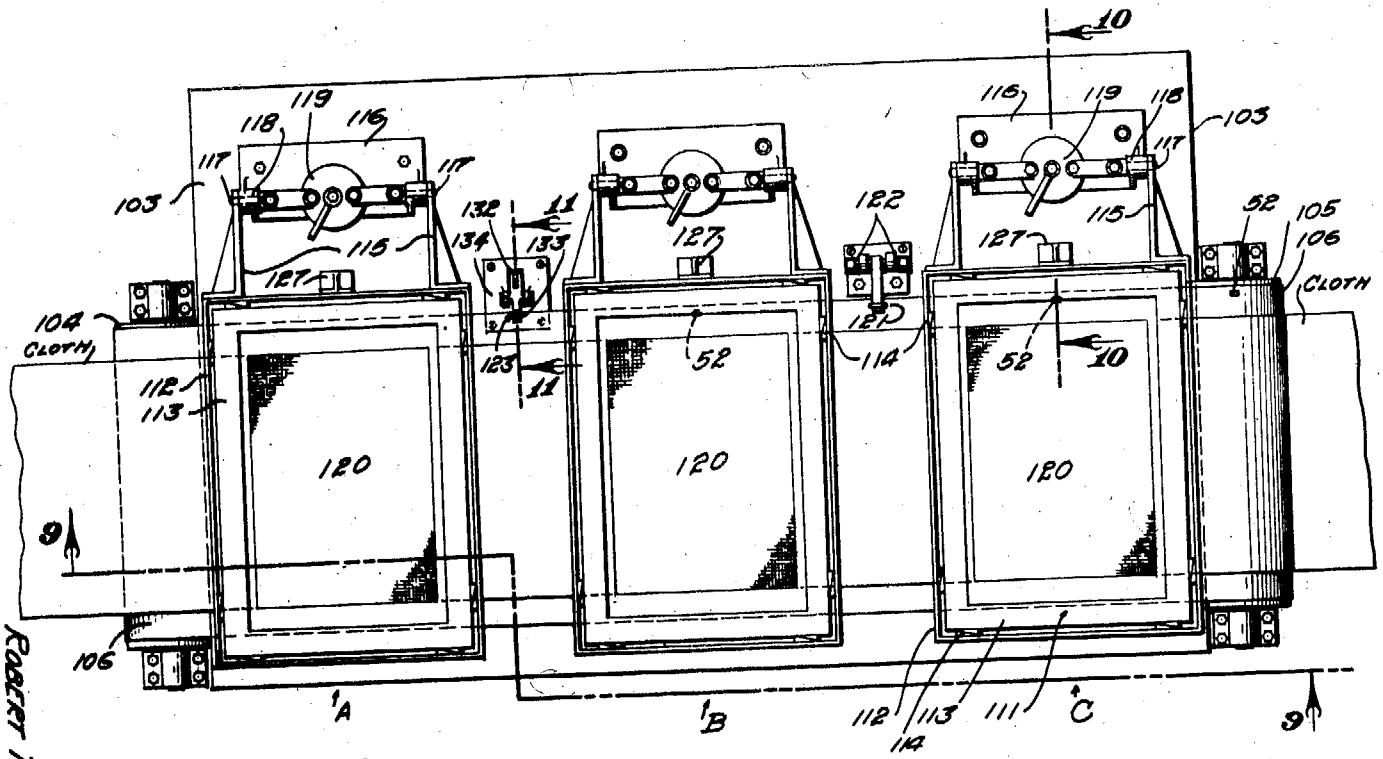
Figure 8 is a plan view of a modified form of my apparatus.

It should be noted that the endless backing sheet arrangement shown in Fig. 1 may be used in conjunction with the printing screen arrangement shown in Fig. 8; and conversely the continuous backing sheet arrangement shown in Fig. 8 may be used in conjunction with the printing frame arrangement shown in Fig. 1.

Although I have shown and described certain apparatus and methods of screen printing on cloth, it is my intention to include within the scope of my invention all novelty inherent in the appended claims.

I claim:

1. A screen printing means, comprising: a work table defining a work area; a backing sheet; means for moving said backing sheet over said work table including a drive means having a fast speed and a slow speed, and an instrumentality incorporating said backing sheet for controlling said drive means to cause said drive means to change from its fast speed to its slow speed and thereafter stop with said backing sheet in a predetermined relation with the table; a series of printing screens, means for positioning said printing screens in predetermined relation with said table and thereby in predetermined registry with said backing sheet; and means for securing cloth to be printed to said backing sheet whereby successive sections of said cloth is moved by the backing sheet into said predetermined registry with said printing screens.

2. A screen printing means as set forth in claim 1 wherein said printing screens employ dyestuff containing an adhesive constituting, when applied to said backing sheet and cloth, means whereby the backing sheet and cloth are secured to each other.

3. In a means for screen printing on cloth: a plurality of printing screens adapted to be operatively positioned over a work area; an endless backing sheet adapted to be moved along said work area; a drive means for said backing sheet, including a control instrumentality incorporated in said backing sheet for positioning successive sections of said backing sheet in predetermined registry with said screen printing frames; said backing sheet adapted to receive cloth to be printed, and said screen printing frames employing dyestuff having adhesive characteristics adapted when applied to said backing sheet and cloth to form a temporary bond therebetween; said drive means incorporating a control device including means for marking said backing sheet, and means positioned in predetermined spaced relation with said marking means responsive to the markings made thereby for stopping said drive means.

4. In a screen printing means for cloth, the combination with a work table and a series of screen printing frames adapted to be placed on said table in predetermined relation with each other and with said table, of a cloth feeding means comprising: a backing sheet adapted to pass over said work table and receive prints from said screen printing frames; means for advancing said backing sheet including a reversible motor, a pair of unidirectional drive means interposed between said motor and advancing means, one of said unidirectional drive means being operatively connected when the motor is driving forward and the other when the motor is driving in reverse, a speed reduction and reversing unit interposed between one of said drive means and said motor, whereby upon rotation of said motor in one direction said advancing means moves at a fast speed, and upon rotation of said motor in the reverse direction said advancing means continues at a slow speed; and control means for said motor incorporating said backing sheet and adapted to effect change from said fast speed to said slow speed and thereafter stop said motor; said backing sheet adapted to receive and carry the cloth to be printed.

5. In a screen printing means for cloth, the combination with a work table and a series of screen printing frames adapted to be placed on said table in predetermined relation with each other and with said table, of a cloth feeding means comprising; a backing sheet in the form of an endless belt adapted to pass over said work table; a driving and idler drum for said backing sheet; means operatively associated with said backing sheet and with said drums to control lateral shifting of said backing sheet as said sheet is advanced by said drums; means for driving said driving drum including a control instrumentality incorporating said backing sheet for positioning successive sections of said backing sheet in predetermined registry with said table and said printing frames and said backing sheet adapted to receive the cloth to be printed.

6. A screen printing means comprising: a printing table; a plurality of printing frames arranged in consecutive series along said table in predetermined spaced relation with each other; a backing sheet adapted to be fed over said printing table and under said printing frames and adapted to carry the cloth to be printed; means for adhering the cloth to the backing sheet; and drive means for moving said backing sheet and cloth in stages along said table.

7. A screen printing means, comprising: a work table defining a work area; a backing sheet; means for moving said backing sheet over said table including a drive means having a fast speed and a slow speed. and an instumentality incorporating said backing sheet for controlling said drive means to cause said drive means to change from its fast speed to its slow speed and thereafter stop with said backing sheet in predetermined relation with the table; a series of printing screen frames adapted to be stacked vertically above each other at one side of the work table and movable in sequence over said work area; means for positioning said printing screens in predetermined relation with said table and thereby in predetermined registry with said backing sheet; and means for securing cloth to be printed to said backing sheet whereby successive sections of said cloth is moved by the backing sheet into said predetermined registry with said printing screens.

8. A screen printing means, comprising: a work table defining a work area; a backing sheet; means for moving said backing sheet over said table including a drive means having a fast speed and a slow speed, and an instrumentality incorporating said backing sheet for controlling said drive means to cause said drive means to change from its fast speed to its slow speed and thereafter stop with said backing sheet in predetermined relation with the table; a series of printing screen frames hinged to a side of said table, and adapted to overlie said work area, the spacing between said screens being equal to or a multiple of the width of their printing areas; whereby as said backing sheet is moved in stages determined by said drive means and instrumentality, sections of said backing sheet register consecutively with said printing screens; and means for securing over said backing sheet, a cloth to be printed.

ROBERT F. FOARD.